(No Model.)    8 Sheets—Sheet 1.

W. P. HOSKINS.
SHIP'S BERTH.

No. 544,981.    Patented Aug. 20, 1895.

WITNESSES    INVENTOR (No Model.) 8 Sheets—Sheet 4.
W. P. HOSKINS.
SHIP'S BERTH.

No. 544,981. Patented Aug. 20, 1895.

Fig. 9.

WITNESSES
Henry Sherrell
Arthur T. Sadler

INVENTOR
William Parish Hoskins
By Connolly Bros. Attys (No Model.)  8 Sheets—Sheet 6.

W. P. HOSKINS.
SHIP'S BERTH.

No. 544,981.  Patented Aug. 20, 1895.

WITNESSES
Henry Sherrett
Arthur T. Sadler

INVENTOR
William Parish Hoskins
By Connolly Bros Attys (No Model.) 8 Sheets—Sheet 7.

W. P. HOSKINS.
SHIP'S BERTH.

No. 544,981. Patented Aug. 20, 1895.

(No Model.) 8 Sheets—Sheet 8.
W. P. HOSKINS.
SHIP'S BERTH.

No. 544,981. Patented Aug. 20, 1895.

WITNESSES
Henry Skerrett
Arthur J. Sadler

INVENTOR
William Parish Hoskins
by Connolly Bros Attys

UNITED STATES PATENT OFFICE.

WILLIAM PARISH HOSKINS, OF BIRMINGHAM, ENGLAND.

SHIP'S BERTH.

SPECIFICATION forming part of Letters Patent No. 544,981, dated August 20, 1895.

Application filed December 6, 1892. Serial No. 454,298. (No model.) Patented in England February 27, 1886, No. 2,844, October 19, 1886, No. 13,304, October 28, 1889, No. 16,967, and August 1, 1891, No. 13,098, and in Germany June 18, 1891, No. 60,358.

*To all whom it may concern:*

Be it known that I, WILLIAM PARISH HOSKINS, berth manufacturer, a subject of the Queen of Great Britain, residing at Upper Trinity Street, Bordesley, in the city of Birmingham, England, have invented certain new and useful Improvements in Berths; and I do hereby declare the following to be a full, clear, and exact description of the invention, reference being had to the accompanying drawings, which form part of this specification, and for which invention Letters Patent of Great Britain have been granted bearing date February 27, 1886, No. 2,844, October 19, 1886, No. 13,304, October 28, 1889, No. 16,967, and August 1, 1891, No. 13,098, and in Germany, No. 60,358, dated June 18, 1891.

This invention has relation to sleeping-berths—such, for example, as are employed on board a ship or a ship's cabin, night-traveling railway-carriages, barracks, prisons, temporary structures, and the like; and it consists in the novel construction, combination, and arrangement of parts hereinafter described and claimed.

Fig. 13 is a top side plan of the parts shown in Fig. 12. Fig. 21 is a similar view of the same semi-contracted for a snug berth. Fig. 22 is a vertial sectional view of the same partly folded, while Fig. 23 is a similar view of the said berth fully folded.

In the drawings, *a* is the front angle-framing.

*b* is the back or inner side of berth.

*c* is the berth bottom, and *d* are the end angle-irons, which, with the aforesaid parts $a$, $b$, and $c$, constitute the berth-framing.

$e$ is an elevated back rail, running longitudinally from end to end of the inner side of the berth, and which rail is provided with plain or rollered joint or trunnion centers $f$, and is mounted at the summit of upright pillars $g$, directed upwardly from the two opposite ends of the framing of the berth. This crank or angular jointing leaves a space for the bedding when the berth is turned up equal to the distance between the top side of the berth-frame and the joint.

$h$ are fixed carrier-brackets, secured to two opposite points of the cabin-wall or bulk-head $o$, and which carriers have long slots or races $h^2$, wherein the movable trunnion-fulcra $f$ traverse on the folding up or opening out of the berth. The tops $h^3$ of the grooves or races as aforesaid are provided with seat or abutment lugs $h^4$, against the concaved under sides $h'$ of which the enlarged outer ends $e^2$ of the back rail $e$ take their bearings when the berth is unfolded, as in Figs. 1, 6, 7, and 9, and when in this position the trunnion-centers $f$ approach only within a short distance of the said top ends. The bottoms $h^5$ of the races may be open or closed. Thus, when the berth is folded, the movable trunnion-fulcra $f$, which constantly change their positions when the berth is passing from one position to another, lie near the bottom of the said slots or races, as in Figs. 5 and 8, but on the berth being opened out or placed in position, as in Figs. 1, 6, 7, and 9, then the movable trunnion-fulcra rest or remain nearly at the tops of the slots or races $h^3$ of the fixed carriers, and with the ends $e^2$ of the back rail resting on the under side or concaves $h'$ of the lug-rests $h^4$.

$i$ are swinging fulcra bars or hangers which support and suspend the berth-framing. The lower ends of the said bars are connected and jointed at $i^2$ to the said angle-bars, while the upper ends $i^3$ are again respectively connected and jointed to the upper parts of the fixed carriers $h$, and by which means the berth is supported upon suspended and swinging fulcra, which admit of the back or inner side being lowered, and consequently the balancing and counterpoising of the berth. The first movement made on folding brings the inclined and suspended fulcra-bars outwardly until the angle made between the lower joints and the trunnion-centers are below a line directed horizontally from the said lower joints. The further folding of the berth now draws inward the fulcra-bars, which fold up with the frame and support the inner side of the berth, on the trunnion ends sliding down the slots or races until the berth assumes a vertical position, and when in this position it is counterpoised and requires no holding expedients to secure it from falling forward on the rolling of the ship.

The parallelism of the motion of the berth and the means which allow its inner side to be directed to a lower position is determined by the dual joints $f$ $i^2$, and upon the joint $i^2$ of which said joints the berth changes its position, while the other joints $f$ serve as centers for both the turning up and down of the berth, shifting centers for the lowering of the berth, and form rests for determining the position of the berth.

Figures 7, 8:
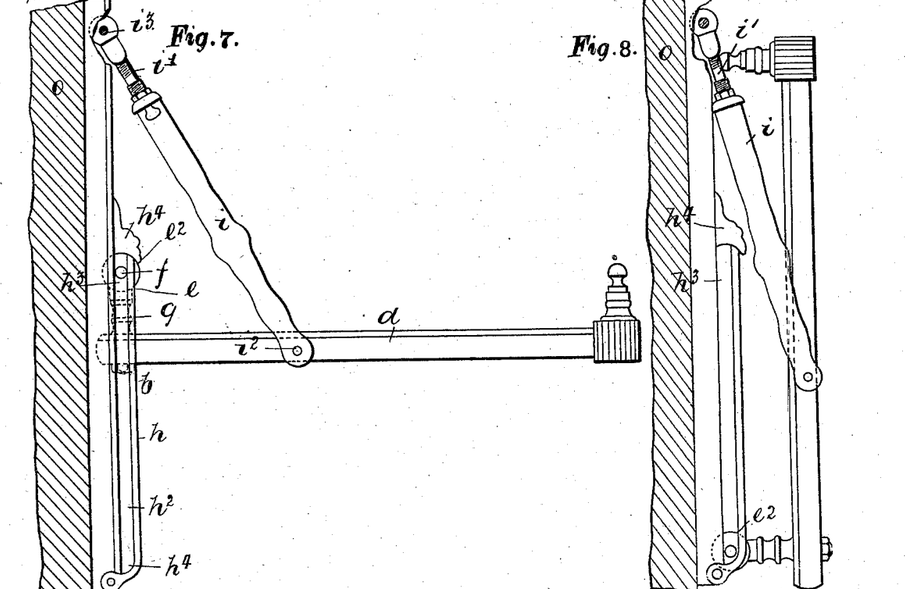
Fig. 7 is a vertical sectional view of a modification in which the berth-framing is made to take a greater rear action than that of the arrangements shown in Figs. 1 to 6.
Fig. 8 is a similar view to Fig. 7, but with the berth folded.
Figure 9:
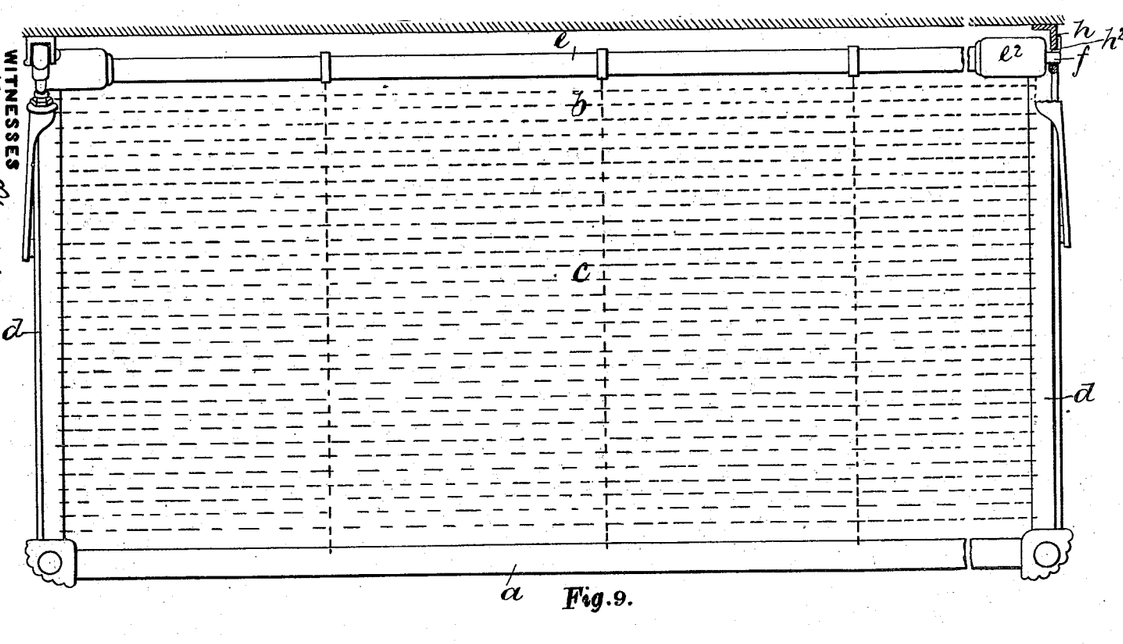
Fig. 9 is a full top side plan of the berth shown in Figs. 7 and 8.

The suspended fulcra-bars $i$, in Figs. 7 and 8, may be lengthwise adjustable by screws marked $i'$.

If necessary, the radius-bars may be made detachable at their lower ends by providing the same with slots $i^4$, taking over and engaging with the joints or studs $i^2$, carried at the inner sides $d$ of the framing.

The front of the framing of the berth, which has the front rail marked "$a$," is provided with an interchangeable and fitted lee rail, which is adapted to be affixed to either the foot or the head of the berth-framing, as may be desired, by making its slotted or hook-shaped end parts $j^2$ engage with upright screwed pegs or stalks $a^2$, proceeding upward from the summits of erect pillars or cast brackets $a'$, made rigid with the front side framing bars or rods $a$ and $d$. The lee rail lower parts are connected to the framing by eyes $j^3$ of hanging bracket-arms $j^4$ of the lee rail $j$, taking upon horizontal screwed pegs $a^4$, carried by and made fast with hanger-brackets $a^5$ of the front framing-rod $a$. Two of these peg-brackets $a^4$ $a^5$ are disposed at the extreme ends of the joint-framing, adjacent to the upright section-pillars $a'$, while the third peg-bracket is situated at an even distance between those aforesaid, so that the lee rail can be changed from the right-hand end to the left hand end, as may be required, and when in the secured position may be prevented from coming away by nuts $a^6$ taking upon the ends of the pegs $a^4$. When either at the head or foot end, the rail admits of folding, and in the position, Fig. 5, but when in use the same is affixed as in Figs. 1, 10, 12 and 13. Thus, after the rail has been swung back into an erect position the same is affixed or locked by the gaps $j'$ of the parts $j^2$, taking over or coming around the pegs or stalks $a^2$, when by the screwing home of the coned nuts $a^7$ the same becomes rigidly affixed to the summit of the pillars $a'$ and the pegs or stalks $a^2$ of them.

On the lee rail's position requiring to be changed from the right-hand side of a berth to the left, the same is unlocked by the unscrewing of the locking connections and the turning or folding of the lee rail upon its pegs or joints $a^4$. This done, remove the nuts $a^6$, when the eyed brackets $j^4$ of the rail can then be made to take upon the pegs for the affixing of it to the right-hand side, as represented in dotted lines in Fig. 10. The inner end of the framing is provided with a trussed and jointed stay-bar framing $k$, (see Figs. 1, 5, and 14,) consisting of a downwardly-cranked middle part $k^2$, outer ends $k^3$, terminated by trunnion-centers $k^4$, working within bearings $b^2$ of hanger-brackets $b^3$, directed from the under sides of the upright extensions or pillars $g$ of the said berth-framing.

Figure 5:
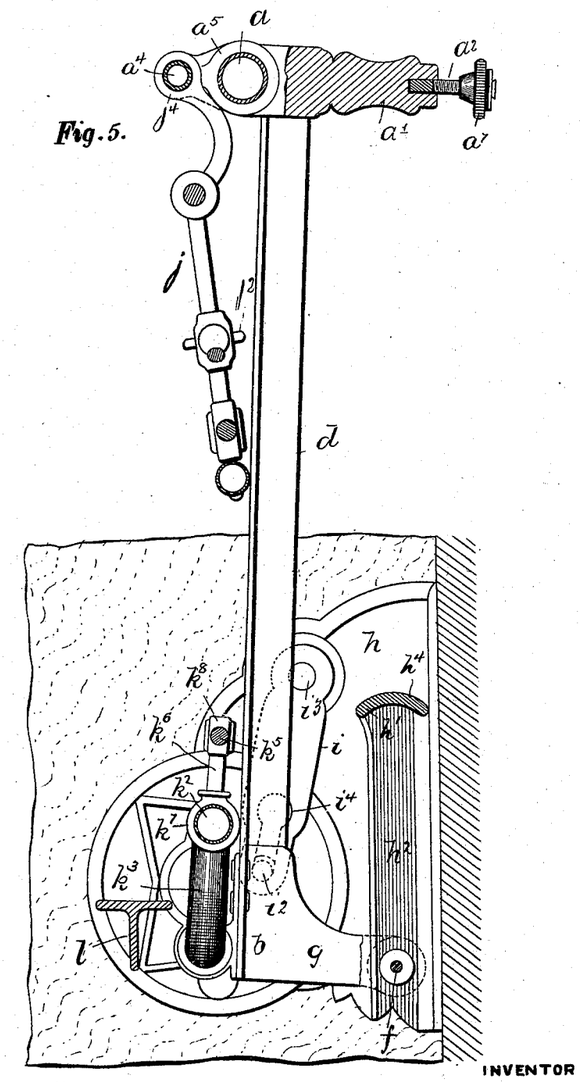
Fig. 5 is a vertical sectional view representing the said berth, Fig. 1, folded and with the lee rail unfastened and turned back.

$k^5 k^6$ are supplementary tie-rods, running parallel, or nearly so, with the upper and cranked rods $k^2 k^3$ and united to them and distance-stays $k'$ by chills or junction-castings $k^7 k^8$. Hence by making a stay-rod composed of a series of members, with the middle ones cranked downward to admit of the mesh $c$ having a clearance underneath on being distended downward, and, further, by making the stay up of a series of trussed and tied-together parts, the same is endowed with great strength, and is eminently adapted to resist any tensile strain which may be put upon the framing, and, further, by the said stay being jointed the same admits of being turned flat to the under side of the mesh $c$ when the berth is folded or when stowed away, as shown in Fig. 5.

By employing elevated pivots or trunnion-centers $f$ with elevated end rails $e$, the berth when folded up leaves a space between itself and the bulk-head, between which the clothes or mattress of the berth lie or are disposed.

Figures 1, 2, 3, 4:
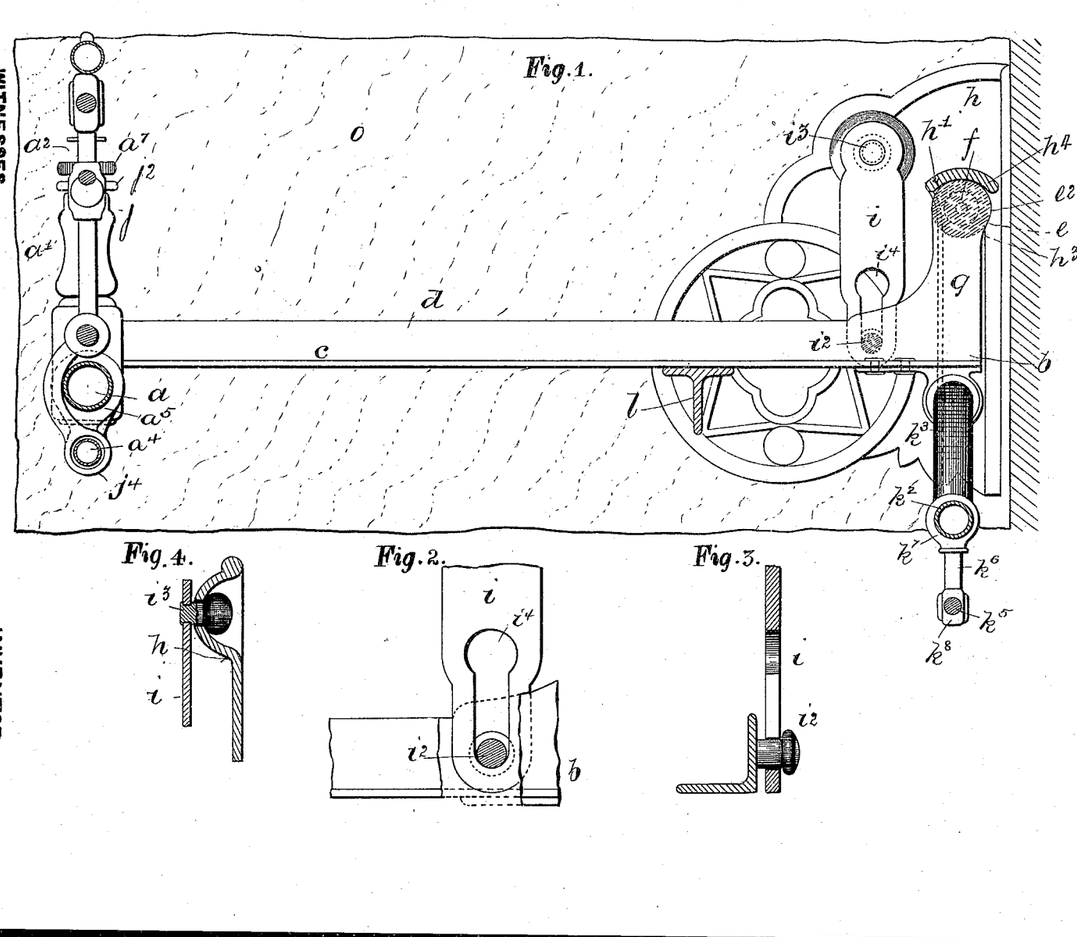
Figure 1 of the accompanying drawings represents, partly in section and partly in elevation, a fold-up ship's berth constructed, arranged, fitted, and provided according to my invention. The said berth is shown in the position which it occupies when the same is in use or turned down and with the lee rail, which is the front boundary and closure framing, shown up.
Fig. 2 is a sectional detail view representing the lower portion of the fulcrum-bar, as hereinafter described, and showing its connections with pins carried upon the two opposite sides of the angle-framing of the berth.
Fig. 3 shows a section of Fig. 2.
Fig. 4 is a section of the jointed upper end of the said fulcrum-bar, which consists of berth-frame hangers suspended from framings or brackets connected to the bulk-heads or sides of a cabin.

In Fig. 1 the under sides of the berth-framings are supported by rest-brackets $l$, carried by the bulk-head or cabin-walls $o$, and upon which the berth-framing inward of the fulcra or radius bars $i$ bears, and is thereby supported between the seats $h^2$ of the lugs $h^3$ of the brackets $h$, the bearings $l$, and the fulcra-joints, headed studs or pivots $i^2$.

Figure 6:
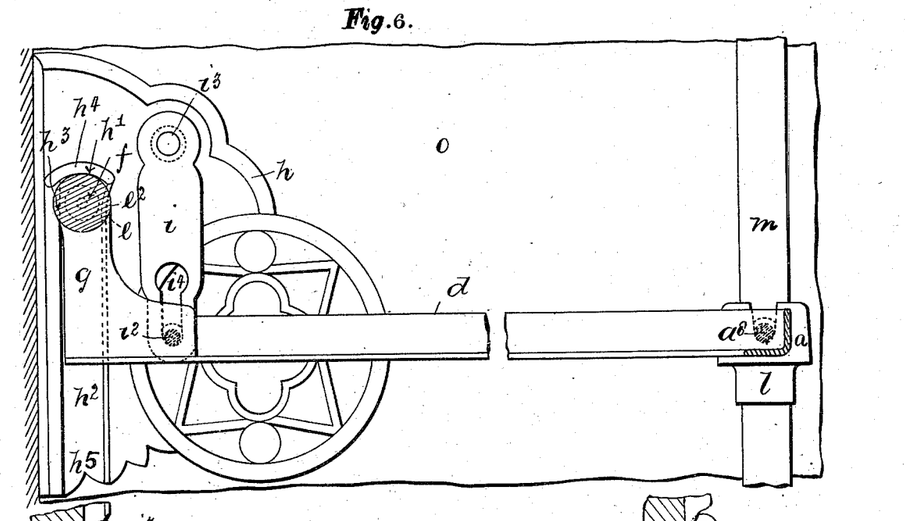
Fig. 6 is a vertical sectional view of a modification, representing the berth supported at its fore part by pillars, instead of inwardly-disposed rest-brackets, as in the preceding figures. (By mounting and hanging the berths in manner as represented, the same on being folded become balanced, semibalanced, or counterpoised, and are also endowed with rear-action movements, so that the dead-weight of the berth on being raised is transferred to the back of the frame, thus allowing the same to be folded with comparative ease, and furthermore in consequence of the inner end of the berth-frame lowering itself on being folded space is economized.)

In Fig. 6 the fore part of the berth-framing is supported by pillars $m$, with cupped and socketed brackets $l$, wherein pins or studs $a^8$, carried by the fore part $a$ of the framing, take.

Figures 10, 11, 12, 14, 15:
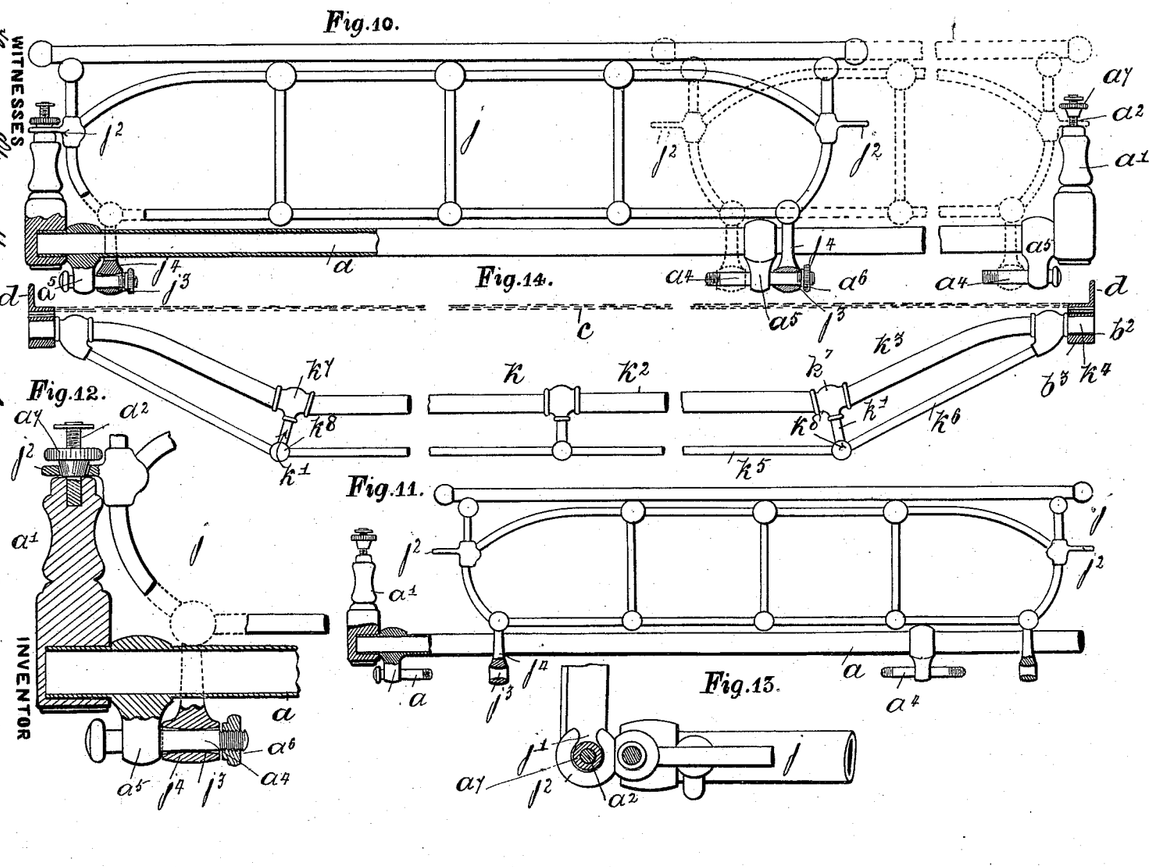
Fig. 10 is a side elevation, partly in section, of the interchangeable lee rail of the berths shown in Fig. 1, and also the front framing parts.
Fig. 11 is the lee rail separately, partly in section and partly in elevation.
Fig. 12 is an enlarged sectional view of one end of the lee rail and its connection.
Fig. 14 is an elevation of the stay-framing of the berth.
Fig. 15 is a side elevation of a modified form of turn-down folding berth.
Figure 15:
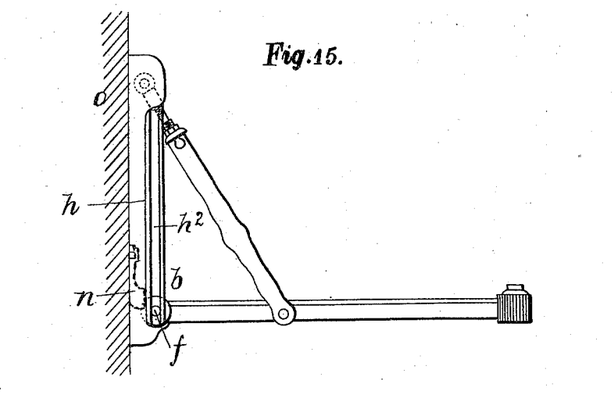

In Fig. 15 the trunnioned or rollered ends $f$, carried at the inner end $b$ of the frame, traverse upwardly within the races $h^2$ of the fixed brackets $h$. The folding is performed by turning the berth downward, while the berth is retained in its horizontal position, as in Fig. 15, by a pivot-catch $n$.

Figure 16:
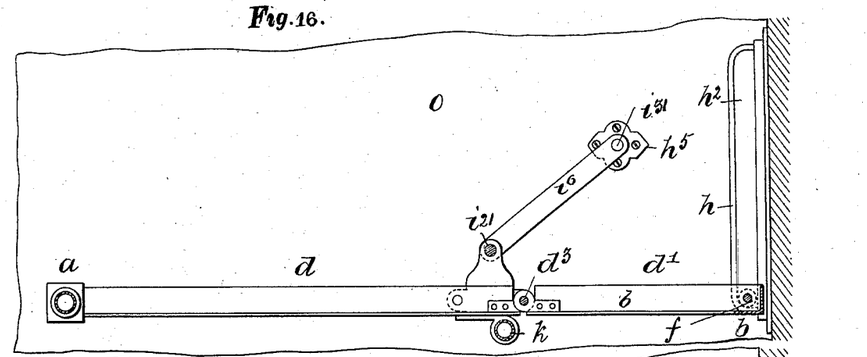
Fig. 16 is a vertical sectional view of an extensible berth.

In the distensible berth, Fig. 16, $a$ is the front of the framing, with the sides composed of two sections $d\ d'$, jointed together at $d^8$, and with the inner ends of the sections $d$ connected and supported by fulcra-bars $i^6$, pivotally jointed at $i^{21}$ to the said inner ends, while the other and upper ends $i^{31}$ are pivotally connected to a bracket $h^5$, secured to the bulk-head or cabin-walls $o$. The inner end $b$ of the section $d'$ has rollered, pivoted, or trunnion ends $f$, which work within the race $h^2$ of the bracket $h$, which is in this case separated from the part which supports the fulcra-bars. When a wide berth is required, both sections of the framing are turned out, as in Fig. 16; but when a narrow berth is required the pivoted or trunnion ends of the section $d'$ are made to slide up the races $h^2$ until the said sections $d'$ become lignable, or nearly so, with the brackets, hence the diminishing of the berth to the extent of the said section $d'$. The fore part comprehended by the sections $d$ of the framing is folded up against the bulk-head. The inner part of the section $d$ is fitted with a cranked stay $k$, preferably alike in construction to that represented in Figs. 1, 5, and 14.

Figure 17:
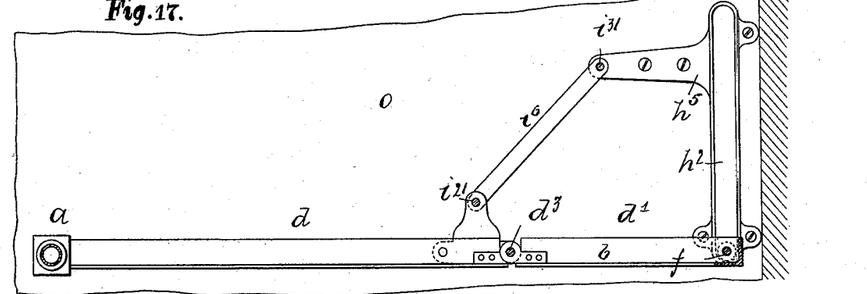
Fig. 17 is a similar view of a modified form of the same.

Fig. 17 represents a modification of Fig. 16, with the parts referred to by like letters of reference.

Figure 18:
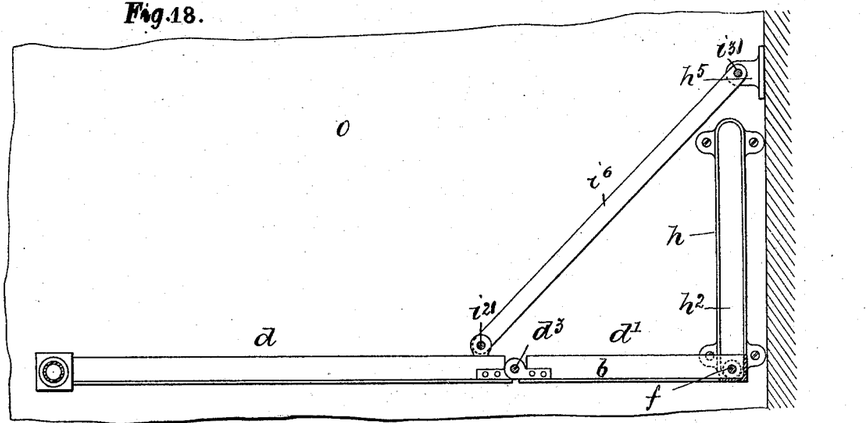
Fig. 18 is a similar view of another form of extensible ship's berth mounted in a manner that the same admits of being made into either a snug or a commodious one, as in the preceding Figs. 16 and 17.
Figure 19:
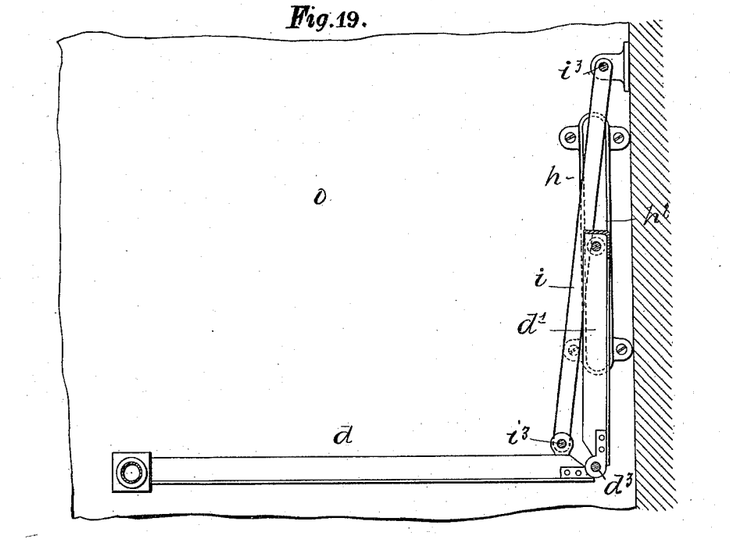
Fig. 19 is a similar view to Fig. 18, but with the berth made into a snug berth to be occupied by one person.

In Fig. 18, $d\ d'$ is a jointed berth-framing pivoted at $d^3$ and with the same supported by fulcrum-bars $i^6$, jointed at $i^{21}\ i^{31}$, the latter to brackets $h^5$, secured to the bulk-head or cabin-sides $o$. $h$ are traversing-brackets with races $h^2$, up which the rollered ends $f$ pass on the contraction of the berth-framing, as in Fig. 19.

Figure 20:
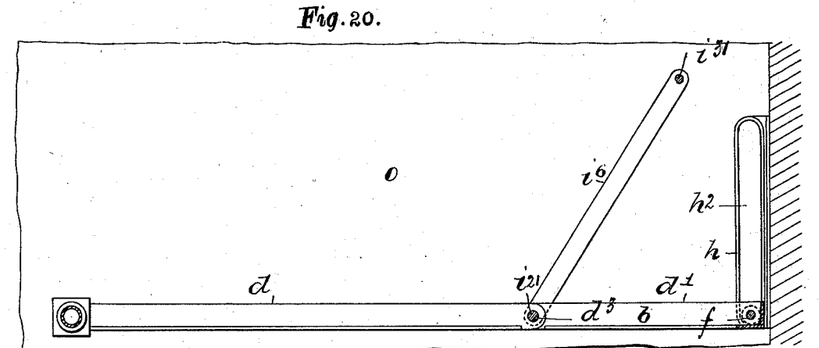
Fig. 20 is a vertical sectional view of the form of berth shown in Fig. 18, but with the connection end of the radius-bar made to the joint of the folding frame.

In Fig. 20 the sides of the berth-framing are made in sections $d\ d'$, jointed at $d^3$, and with the said jointed part supported by fulcrum-bars $i^6$, with ends jointed at $i^{21}\ i^{31}$, and with the inner ends $b$ fitted with pivots or rollered trunnions $f$, adapted to roll up the race $h^2$ of the bracket $h$, fixed to the bulk-head or cabin-walls $o$.

Figures 21, 22, 23:
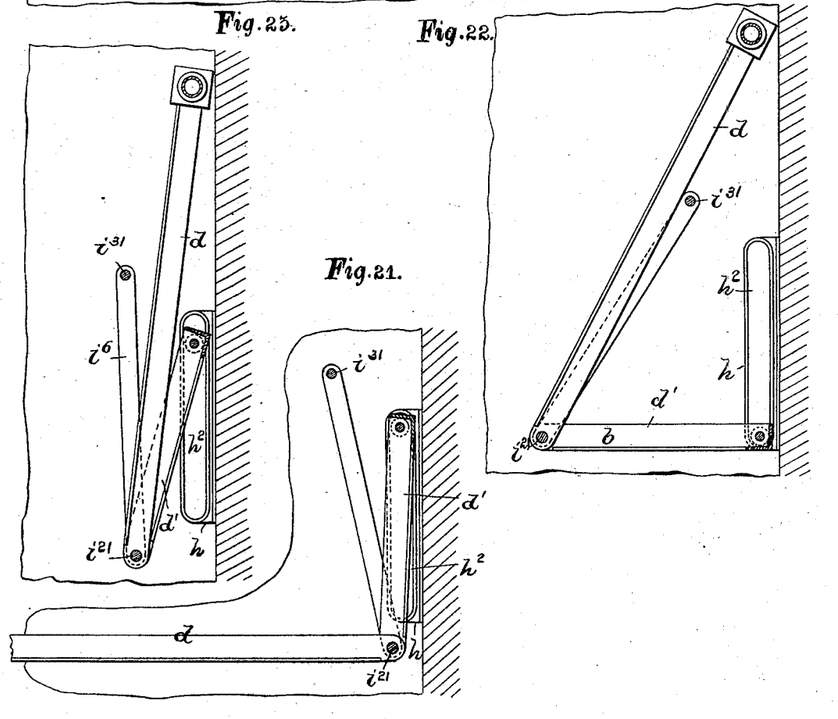

Figs. 21, 22, and 23 represent the respective positions which the said berth takes on the same being reduced to a single berth, a semi-folded berth, and a complete folded berth, respectively.

The application of my invention to other berths differs in no essential respect from its application to a ship's berth, as herein described.

Having described my invention, I claim—

1. The combination with a stationary bracket and a radius bar or swinging fulcrum, of a berth pivoted to said radius bar, and having a pivot center vertically movable on said bracket, substantially as described.

2. The combination with a stationary bracket having a vertical race, and a radius bar or swinging fulcrum, of a berth pivoted to the lower end of said radius bar and provided with a pivot center working in said race, substantially as described.

3. The combination with a stationary bracket and a swinging fulcrum or radius bar, of a berth pivoted to said fulcrum or bar, and having a pivot center elevated above the general plane of the berth and sliding on said bracket, substantially as described.

4. The combination in a folding berth of a stationary bracket having a vertical race, with a berth having a pivot center elevated above the general plane of the berth and working in said race, substantially as described.

5. In folding berths, the combination with the framing supported and hung at its inner end by double pivots or joint centers, of vertically disposed traverse races $h^2$, carried by brackets $h$, and adapted to admit of rear action and balancing or semi-balancing of the berth, as set forth.

6. In folding berths, the combination with the framing, dual centers, and swinging fulcra or radius bars, of races $h^2$, having upper abutments $h'$, against which latter, enlargements $e^2$, of elevated end rails $e$, abut, substantially as described.

7. The combination with a folding berth frame, of swinging radius bars $i$, located at a short distance from the said inner end, and with the lower parts pivoted or jointed to the sides of the frame, and with the other and upper parts pivoted or jointed to a stationary support, substantially as described and set forth.

8. In folding berths, the combination with the framing, of pivot centers $f$, $i^2$, located respectively at the ends, and near the inner ends of the said framing, brackets $h$, having traversing slots $h^2$, swinging fulcra or radius bars $i$, elevated pillars $g$, back rail $e$, stops or abutments $h'$ $h^3$, and brackets $l$, substantially as described.

9. In folding berths, the combination with a berth framing having pivot bearings of pivotally jointed and cranked stay rods $k$, with pivot ends $k^4$, working within said bearings, substantially as described.

10. In folding berths, the combination with the berth framing of the pillars $a'$, screw threaded pegs $a^2$ on top of said pillars, and nuts $a^7$ on said pegs, of the lee-rail $j$, having hook shaped parts $j^2$, adapted to embrace said pegs, substantially as described.

11. In a berth, the combination with the longitudinally movable lee-rail, having bosses $j^4$, of the berth framing, provided with horizontal interchangeable stalks $a^4$ with nuts $a^6$.

12. In a folding berth, the combination with the berth framing, composed of two jointed sections, of swinging fulcra or radius bars, pivoted at their upper ends, and attached at their lower ends to the inner side of the outer section of the berth, substantially as described.

In testimony that I claim the foregoing I have hereunto set my hand this 2d day of November, 1892.

WILLIAM PARISH HOSKINS.

Witnesses:
HENRY SKERRETT,
ARTHUR T. SADLER.